United States Patent [19]

Dunlap

[11] Patent Number: 5,189,691
[45] Date of Patent: Feb. 23, 1993

[54] VCR WITH VIDEO PHONE ANSWERING CAPABILITY

[75] Inventor: R. Terren Dunlap, Scottsdale, Ariz.

[73] Assignee: Go-Video, Inc., Scottsdale, Ariz.

[21] Appl. No.: 753,228

[22] Filed: Aug. 30, 1991

[51] Int. Cl.$^5$ ...................... H04M 1/64; G11B 31/00; H04N 7/14

[52] U.S. Cl. ........................................ 379/70; 379/53; 379/67; 358/85; 358/335

[58] Field of Search ...................... 379/67, 68, 69, 70, 379/87, 100, 53, 82; 358/85, 335

[56] References Cited

U.S. PATENT DOCUMENTS 4,829,555  5/1989  Hashimoto ............................. 379/70
5,046,079  9/1991  Hashimoto ............................. 379/53

FOREIGN PATENT DOCUMENTS 0005276  1/1989  Japan .................................... 379/53
2158280  11/1985  United Kingdom .................. 379/70

Primary Examiner—Stuart S. Levy
Assistant Examiner—Joseph A. Rhoa
Attorney, Agent, or Firm—Donald A. Streck

[57] ABSTRACT

This invention is a dual-deck VCR including answering machine logic whereby the VCR can also be used to answer a video telephone system. The video cassette decks of the VCR are switched between and are shared by the VCR and telephone answering functions. The VCR can be switched between its answering mode of operation and its VCR mode of operation by a remote controller.

9 Claims, 2 Drawing Sheets

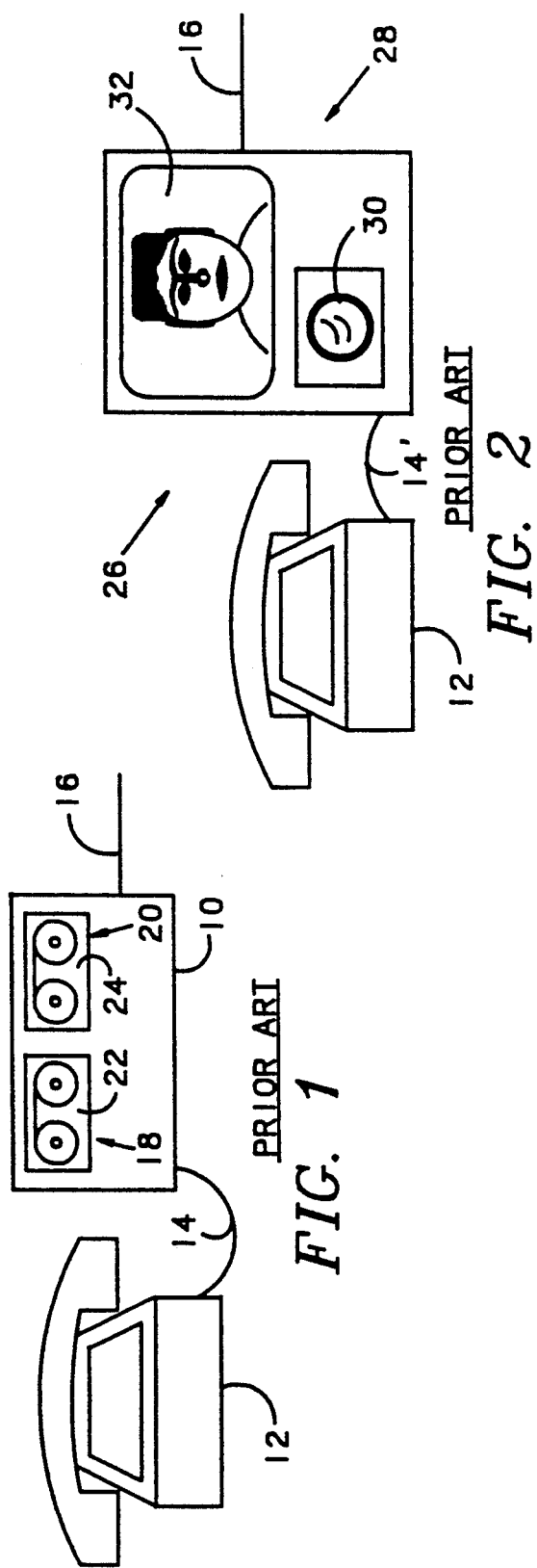
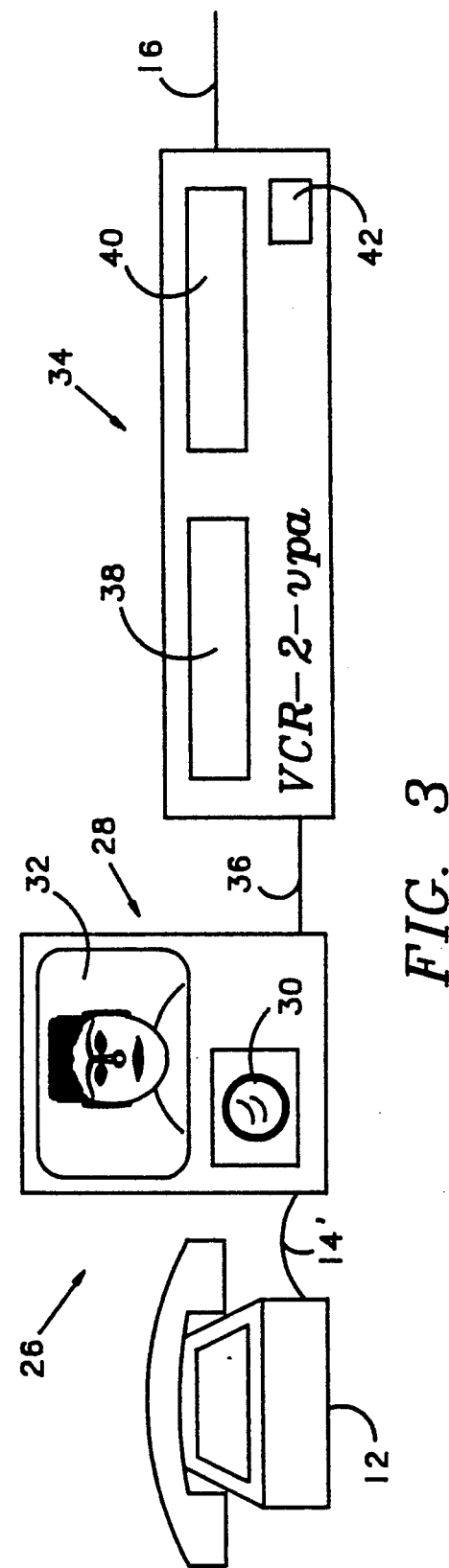
FIG. 1 PRIOR ART
FIG. 2 PRIOR ART
FIG. 3

VCR WITH VIDEO PHONE ANSWERING CAPABILITY

BACKGROUND OF THE INVENTION

This invention relates to telephone answering machines and, more particularly, to an answering machine for a video telephone. In a preferred embodiment, the video answering machine is built into a dual-deck video cassette recorder to share the components thereof and provide additional capability thereto. More specifically, it relates to a dual-deck VCR including answering machine logic whereby the VCR can also be used to answer a video telephone system. The video cassette decks of the VCR are switched between and are shared by the VCR and telephone answering functions. The VCR can be switched between its answering mode of operation and its VCR mode of operation by a remote controller.

Telephone answering systems for answering the telephone and recording a message when the telephone is unattended are well known in the art and used extensively in home and business. As shown in FIG. 1, the typical telephone answering machine 10 is connected to a telephone 12 with a cable 14 containing the "tip" and "ring" pair of a telephone line on one side and is connected to an incoming telephone line 16 (i.e. a tip and ring pair) on the other side. The answering machine 10 typically contains two audio tape drives 18, 20 containing audio tapes 22, 24, respectively. Sometimes a single tape and drive is employed using a front portion of the tape for the pre-recorded outgoing message and a back portion to record incoming messages. Functionally, the two approaches are the same with the use of two tapes being easier to implement. To use the machine 10, the user records an outgoing message on one tape 22. When the machine 10 is subsequently turned on and an incoming call rings in on the telephone line 16, the machine "answers" the call and plays the message on the tape 22 which advises the caller that the machine 10 is answering and will record a message for the caller. If the caller remains on the line and does not hang up, any message spoken will be recorded on tape 24 for later playing by the user to retrieve the message recorded thereon.

The video telephone system 26 of FIG. 2 is just becoming available on a limited commercial basis and will gain popularity in the coming years as the systems become less costly through mass production and general availability. The system 26 comprises a telephone 12 having a video unit 28 connected between a cable 14' and an incoming telephone line 16 in a manner similar to that of the answering machine 10 of FIG. 1. The video unit 28 includes a video camera 30 for viewing a user thereof and a monitor 32 for displaying what the video camera 30 of a calling system 26 is viewing. Thus, both parties to a conversation employing the system 26 can see each other. At present, however, there is no video answering machine providing the benefits of the answering machine 10 of FIG. 1 with full voice and video capability for use with the system 26 of FIG. 2. The reason for employing a video phone is to be able to see the caller as well as speak to him/her. Accordingly, it would be desirable to have a video telephone answering machine which could be used by owners and users of video telephone systems. A video telephone answering machine would, because of the cost of the parts necessary to be incorporated therein, be a high cost item. Therefore, it would be desirable to incorporate the video telephone answering machine into another device providing additional benefits so as to lower the apparent cost to the user for individual ones of the benefits.

Wherefore, it is an object of the present invention to provide a video telephone answering machine which could be used by owners and users of video telephone systems to provide full video and audio outgoing and incoming messages.

It is another object of the present invention to provide a video telephone answering machine which is incorporated into another device providing additional benefits so as to lower the apparent cost to the user for individual ones of the benefits.

It is still another object of the present invention to incorporate a video telephone answering machine into a dual-deck video cassette recorder to share the major components thereof.

Other objects and benefits of the invention will become apparent from the detailed description which follows hereinafter when taken in conjunction with the drawing figures which accompany it.

SUMMARY

The foregoing objects have been achieved by the answering machine for unattended answering of a video telephone system of the present invention comprising, first video read/write deck means for containing a video cassette and for writing video signals to the cassette and for reading video signals therefrom; second video read/write deck means for containing a video cassette and for writing video signals to the cassette and for reading video signals therefrom; input means connected to a telephone line for receiving incoming video telephone calls; output means connected to a telephone line input of the video telephone system for bi-directionally communicating with the video telephone system; and, answering logic means connected to the first video read/write deck means, the second video read/write deck means, the input means, and the output means for recording outgoing video answering messages on the cassette of the first video read/write deck means, for answering incoming calls on the telephone line, for playing contents of the cassette of the first video read/write deck means to incoming callers on the telephone line, for recording incoming video messages on the cassette of the second video read/write deck means, and for playing back recorded incoming video messages on the cassette of the second video read/write deck means to a user.

In the preferred embodiment, the first video read/write deck means and the second video read/write deck means comprise tape decks of a dual-deck video cassette recorder (VCR). Also, the dual-deck VCR includes television connection logic means for operably connecting the first video read/write deck means and the second video read/write deck means to a television set and a television signal input and switching means for selectively switching connections from the first video read/write deck means and the second video read/write deck means between the television connection logic means and the answering logic means whereby the dual-deck VCR can be used in conjunction with television viewing and recording and in conjunction with video telephone answering. There is also control means for selectively switching the switching means between an answering mode with the answering logic means connected to the first video read/write deck means and the second video read/write deck means and a VCR mode with the television connection logic means connected to the first video read/write deck means and the second video read/write deck means. The preferred embodiment also includes remote control input means connected to the control means for allowing a user to switch the switching means between the answering mode and the VCR mode on demand.

According to one disclosed approach, the first video read/write deck means and the second video read/write deck means are controlled by the television connection logic means and the control means includes means for receiving control requests for the first video read/write deck means and the second video read/write deck means from the answering logic means and for outputting them to the television connection logic means.

DESCRIPTION OF THE DRAWINGS

FIG. 1 is a simplified drawing of a prior art telephone answering system for answering unattended voice telephones only.

FIG. 2 is a simplified drawing of a prior art video telephone system having no unattended answering capability.

FIG. 3 is a simplified drawing of a video telephone system having unattended answering capability according to the present invention employing a dual-deck video cassette recorder for the recording functions thereof.

DESCRIPTION OF THE PREFERRED EMBODIMENT

Figure 4:
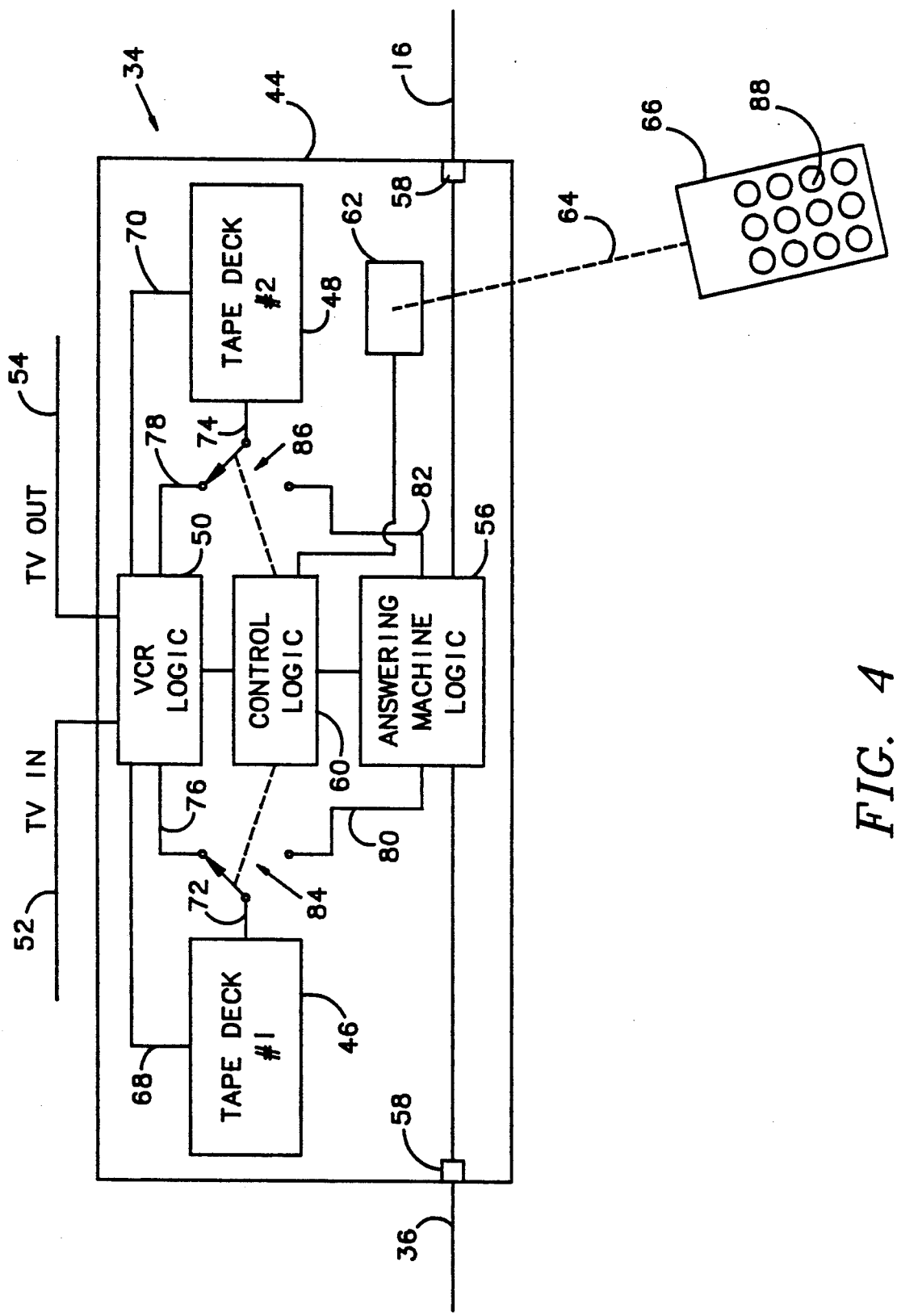
FIG. 4 is a functional block diagram of a dual-deck video cassette recorder incorporating an unattended answering capability for a video telephone system according to the present invention.

The assignee of this invention is also the owner of patents on a dual-deck video cassette recorder (VCR) sold commercially under the tradename VCR-2. While the present invention could be implemented employing two separate VCRs with great additional cost and complexity, it is preferred that a dual-deck VCR be employed to simplify the implementation of the present invention. It is, however, the intent that the use of a preferred embodiment for illustrative purpose not be limiting in any way as to the breadth to be accorded the claims appended hereto and that they be given a breadth in keeping with the scope and spirit of the invention described hereinafter.

As shown in simplified form in FIG. 3, the video phone answering dual-deck VCR 34 of the present invention is connected between the video unit 28 of a video telephone system 26 and the incoming telephone line 16. A second cable 36 connects the VCR 34 to the input of the video unit 28 normally having the telephone line 16 input thereto so as to connect the VCR 34 in series with the telephone line 16 and the video unit 28. As depicted in FIG. 3, the VCR 34 has a pair of slots 38, 40 into which standard video cassettes can be inserted. There is also an infrared (IR) signal receiving window 42 into which IR control signals from a controller (not shown in this figure) can be directed to control the operation of the VCR 34.

Turning now to FIG. 4, the construction of the VCR 34 which enables it to perform its dual functions through the sharing of major components is shown in functional block diagram form. Where components and their manner of operation are well known to those skilled in the art and per se form not part of the novelty of the present invention, there will be no attempt to provide a detailed description thereof in the interest of simplicity and the avoidance of redundancy herein. Since the novelty of the present invention resides in the combination of functions and the sharing of components to provide a synergistic effect to the combination, only those aspects will be addressed in any detail.

The VCR 34 comprises a case 44 containing a pair of video tape decks 46 and 48, labelled "#1" and "#2", respectively. There is also VCR logic 50 connected to receive an incoming television signal on line 52 and to transmit an outgoing television signal on line 54. All these components are common and the same as contained in the commercially-available VCR-2 dual-deck VCR of the assignee hereof. Similarly, there is also answering machine logic 56 contained within the case 44 and connected to a pair of RJ-11 telephone jacks 58 on both sides for the convenient attachment of the telephone line 16 and cable 36 thereto. The answering machine logic 56 is substantially similar to that contained within the answering machine 10 of FIG. 1 and many commercially available audio telephone answering machines.

To perform the unique combinatorial functions of the present invention, there is control logic 60 disposed between the VCR logic 50 and the answering machine logic 56 and in communication with both logics 50, 56. The control logic 60 is connected to the IR receiver 62 to receive IR control signals 64 from a user using the hand-held controller 66. Manual buttons and the like for controlling the VCR 34 could be mounted on the case 44; but, use of a remote controller 66 is preferred. As those skilled in the art will readily recognize and appreciate, the conventional control functions associated with the VCR 34 operating in its VCR mode which are normally included in the VCR logic 50 of the VCR-2 dual-deck VCR are moved into the control logic 60 in the present invention. Upon receiving control inputs from the control logic 60, the VCR logic 50 controls the movement and operation of the two tape decks 46, 48 employing control lines 68, 70, respectively.

Additionally, the outputs 72, 74 of the tape decks 46, 48 are connected to the inputs 76, 78 of the VCR logic 50 and to the inputs 80, 82 of the answering machine logic 56 through a pair of switches 84, 86, respectively, which are controlled by the control logic 60. It will be noted that there is no control connection from the answering machine logic 56 to the tape decks 46, 48 as would be present in the audio answering machine 10 of FIG. 1. In the present invention, the VCR logic 50 has total control of the tape decks 46, 48 through the control lines 68, 70 as described above. Thus, when in the "answering" mode with the switches 84, 86 connecting the output lines 72, 74 from the decks 46, 48 to the inputs 80, 82 of the answering machine logic 56, the answering machine logic 56 requests movement of the tape decks 46, 48, for either reading or writing, through the control logic 60 to the VCR logic 50. If desired, however, separate control lines could be run from the answering machine logic 56 to the two tape decks 46, 48.

As mentioned above, the functions performed by the answering machine logic 56 are substantially identical to those of the logic contained in the audio-only answering machine 10 of FIG. 1. Thus, in addition to its normal VCR operating functions, the controller 66 would have to have buttons 88 for switching the mode of the VCR 34 (including the switching of the switches 84, 86) and performing the answering machine functions. Thus, for example, an outgoing message video cassette (not shown) might be inserted into tape deck #1, 46, and an incoming message video cassette (not shown) might be inserted into tape deck #2, 48. A control function of RECORD OUTGOING MESSAGE would then cause the video and audio input by a user using the telephone 12 (or a separate microphone as is a common approach for better fidelity) and the video unit 28 to be recorded on the cassette in deck #1 in substantially the same manner as an audio outgoing message tape is generated. For that matter, pre-recorded video cassette tapes with messages by famous people (real or imaginary) might be sold for use in deck #1 as a joke just as famous people audio tapes are now available commercially. With the mode on "answer" and the VCR 34 turned on, an incoming call would then be answered in the same manner as an audio-only telephone answering machine; that is, the cassette in deck #1 would be played by the answering machine logic 56 in the manner described above using the VCR logic 50 to control the deck #1. The caller would then see the called party and hear the pre-recorded message. If the caller decided to leave a message, that message (both audio and video) would be recorded on tape #2. A PLAY MESSAGES command input to the controller 66 would then cause tape #2 to be rewound and played through the video unit 28.

When not in its "answer" mode and switched back to its "VCR" mode, the VCR 34 of the present invention would, of course, operate in its normal manner as a VCR for both recording and play-back purposes.

Thus, it can be seen that the present invention has truly met its stated objectives by incorporating a video answering machine into a dual-deck VCR whereby the major components of the VCR are shared by the two functions thereby providing diverse benefits at a greatly reduced cost per function.

Wherefore, having thus described the present invention, what is claimed is:

1. An answering machine for unattended answering of a video telephone system comprising:
    a) first video read and write deck means for containing a video cassette tape and for writing video signals onto said video cassette tape and for reading video signals therefrom;
    b) second video read and write deck means for containing a video cassette tape and for writing video signals onto said video cassette tape and for reading video signals therefrom;
    c) input means connected to a telephone line for receiving incoming video telephone calls;
    d) output means connected to a telephone line input of the video telephone system for bi-directionally communicating with the video telephone system; and,
    e) answering logic means connected to said first video read and write deck means, said second video read and write deck means, said input means, and said output means for recording outgoing video answering messages onto said video cassette tape of said first video read and write deck means, for answering incoming calls on said telephone line, for playing contents of said video cassette tape of said first video read and write deck means to incoming callers on said telephone line, for recording incoming video messages onto said video cassette tape of said second video read and write deck means, and for playing back recorded incoming video messages on said video cassette tape of said second video read and write deck means to a user; wherein additionally,
    f) said first video read and write deck means and said second video read and write deck means comprise tape decks of a dual-deck video cassette recorder (VCR); and,
    g) said dual-deck VCR includes television connection logic means for operably connecting said first video read and write deck means and said second video read and write deck means to a television signal input of a broadcast television set; and additionally comprising,
    h) switching means for selectively switching connections from said first video read and write deck means and said second video read and write deck means between said television connection logic means and said answering logic means whereby said dual-deck VCR can be used in conjunction with broadcast television viewing and recording and in conjunction with video telephone answering; and,
    i) control means for selectively switching said switching means between an answering mode with said answering logic means connected to said first video read and write deck means and said second video read and write deck means and a VCR mode with said television connection logic means connected to said first video read and write deck means and said second video read and write deck means.

2. The answering machine for unattended answering of a video telephone system of claim 1 and additionally comprising:
    remote control input means connected to said control means for allowing a user to switch said switching means between said answering mode and said VCR mode on demand.

3. The answering machine for unattended answering of a video telephone system of claim 1 wherein:
    a) said first video read and write deck means and said second video read and write deck means are controlled by said television connection logic means; and,
    b) said control means includes means for receiving control requests for said first video read and write deck means and said second video read and write deck means from said answering logic means and for outputting them to said television connection logic means.

4. A dual-deck video cassette recorder (VCR) including the capability to function as an answering machine for unattended answering of a video telephone system comprising:
    a) first video read and write deck means for containing a video cassette tape and for writing video signals onto said video cassette tape and for reading video signals therefrom;
    b) second video read and write deck means for containing a video cassette tape and for writing video signals onto said video cassette tape and for reading video signals therefrom;
    c) input means connected to a telephone line for receiving incoming video telephone calls;

d) output means connected to a telephone line input of the video telephone system for bi-directionally communicating with the video telephone system;

e) answering logic means connected to said first video read and write deck means, said second video read and write deck means, said input means, and said output means for recording outgoing video answering messages onto said video cassette tape of said first video read and write deck means, for answering incoming calls on said telephone line, for playing contents of said video cassette tape of said first video read and write deck means to incoming callers on said telephone line, for recording incoming video messages onto said video cassette tape of said second video read and write deck means, and for playing back recorded incoming video messages on said video cassette tape of said second video read and write deck means to a user;

f) television connection logic means for operably connecting said first video read and write deck means and said second video read and write deck means to a television signal input of a broadcast television set and;

g) switching means for selectively switching connections from said first video read and write deck means and said second video read and write deck means between said television connection logic means and said answering logic means whereby said dual-deck VCR can be used in conjunction with broadcast television viewing and recording and in conjunction with video telephone answering; and, h) control means for selectively switching said switching means between an answering mode with said answering logic means connected to said first video read and write deck means and said second video read and write deck means and a VCR mode with said television connection logic means connected to said first video read and write deck means and said second video read and write deck means.

5. The dual-deck VCR with capability for unattended answering of a video telephone system of claim 4 and additionally comprising:

remote control input means connected to said control means for allowing a user to switch said switching means between said answering mode and said VCR mode on demand.

6. The dual-deck VCR with capability for unattended answering of a video telephone system of claim 4 wherein:

a) said first video read and write deck means and said second video read and write deck means are controlled by said television connection logic means; and, b) said control means includes means for receiving control requests for said first video read and write deck means and said second video read and write deck means from said answering logic means and for outputting them to said television connection logic means.

7. A dual-deck video cassette recorder (VCR) including the capability to function as an answering machine for unattended answering of a video telephone system comprising:

a) first video read and write deck means for containing a video cassette tape and for writing video signals onto said video cassette tape and for reading video signals therefrom;

b) second video read and write deck means for containing a video cassette tape and for writing video signals onto said video cassette tape and for reading video signals therefrom;

c) input means connected to a telephone line for receiving incoming video telephone calls;

d) output means connected to a telephone line input of the video telephone system for bi-directionally communicating with the video telephone system;

e) answering logic means connected to said first video read and write deck means, said second video read and write deck means, said input means, and said output means for recording outgoing video answering messages onto said video cassette tape of said first video read and write deck means, for answering incoming calls on said telephone line, for playing contents of said video cassette tape of said first video read and write deck means to incoming callers on said telephone line, for recording incoming video messages onto said video cassette tape of said second video read and write deck means, and for playing back recorded incoming video messages on said video cassette tape of said second video read and write deck means to a user;

f) television connection logic means for operably connecting said first video read and write deck means and said second video read and write deck means to a television signal input of a broadcast television set;

g) switching means for selectively switching connections from said first video read and write deck means and said second video read and write deck means between said television connection logic means and said answering logic means whereby said dual-deck VCR can be used in conjunction with broadcast television viewing and recording and in conjunction with video telephone answering; and, h) control means for selectively switching said switching means between an answering mode with said answering logic means connected to said first video read and write deck means and said second video read and write deck means and a VCR mode with said television connection logic means connected to said first video read and write deck means and said second video read and write deck means.

8. The dual-deck VCR with capability for unattended answering of a video telephone system of claim 7 and additionally comprising:

remote control input means connected to said control means for allowing a user to switch said switching means between said answering mode and said VCR mode on demand.

9. The dual-deck VCR with capability for unattended answering of a video telephone system of claim 7 wherein:

a) said first video read and write deck means and said second video read and write deck means are controlled by said television connection logic means; and, b) said control means includes means for receiving control requests for said first video read and write deck means and said second video read and write deck means from said answering logic means and for outputting them to said television connection logic means.

* * * * *